United States Patent Office 3,117,820
Patented Jan. 14, 1964

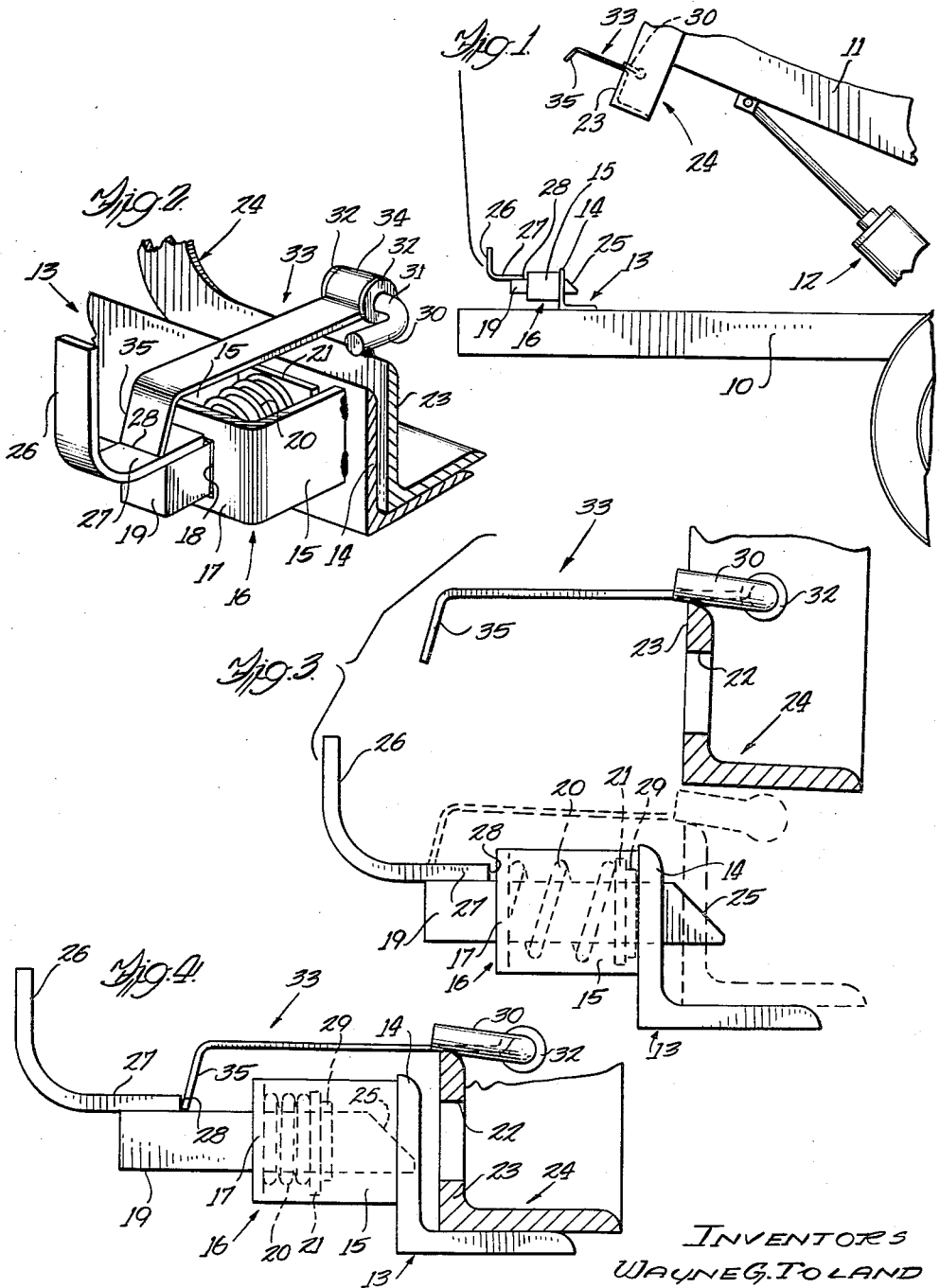

3,117,820
TILTING DUMP BODY LATCH
Wayne G. Toland and Donald F. Christofferson, Stockton, Calif., assignors to International Harvester Company, Chicago, Ill., a corporation of New Jersey
Filed June 9, 1961, Ser. No. 116,167
2 Claims. (Cl. 298—38)

This invention relates to tilt body trucks or trailers. In vehicles of the type herein concerned the body is hinged to the rear portion of the wheeled frame or chassis for tilting rearwardly. Tilting is customarily accomplished by the use of a one-way hydraulic hoisting cylinder connected between the frame and the tilt body, the weight of the body being sufficient to discharge the fluid from the cylinder and return the body to its horizontal position.

However, in going over rough terrain, the bouncing of the body on its pivot damages the cylinder and other connecting parts and endangers the load. Therefore, the principal object of the present invention is the provision of novel means for locking the body in its normal closed or transporting position with respect to the main frame.

Another object of the invention is the provision of means for optionally disabling the locking means to prepare the body for tilting and to avoid damage to the locking means or other vehicle parts that occurs from accidental actuation of the hydraulic hoist.

Other objects and advantages of the invention will become clear from the following detailed description when read in conjunction with the accompanying drawings wherein:

FIGURE 1 is a side elevational detail showing the forward end of a tilt body trailer having latching means thereon incorporating the features of this invention;

FIGURE 2 is a perspective view on an enlarged scale of a detail in partial section of the latching means of this invention, illustrating the closed or locked position of the tilt body with respect to the chassis or frame of the vehicle;

FIGURE 3 is a partial sectional view of the parts separated at the beginning of tilting of the tilt body and;

FIGURE 4 is a view similar to FIGURE 3 with the parts in closed position but with the latching means locked out of operation.

Tilt bed trucks and trailers are well known, their function in the agricultural implement industry being, in part, to facilitate transportation from one place to another of tractors, implements and the like. The details of construction of a tilt bed trailer form no part of this invention and only the pertinent parts of one are illustrated in the drawing.

The conventional tilt bed trailer is actuated by a hydraulic hoisting cylinder which is anchored to the wheeled chassis or frame at one end and has its other end connected to the tilt bed so that upon extension of the piston rod in the cylinder, the bed or body is swung upwardly about its pivot on the frame until the rear end of the tilt body is in engagement with the ground, providing a ramp upon which a tractor or the like can be driven. As the tractor moves past the hinge point of the tilt body the hoisting cylinder, which is usually of the one-way type is retracted and the body sinks to its horizontal closed position with respect to the main frame.

In the drawings the wheeled frame is designated at 10 and the tilt body at 11. The body is tilted by a hydraulic cylinder 12.

To the forward end of frame 10 is affixed a cross bar in the form of an angle 13 having an upright flange 14 to which are affixed the sides 15 of a U-shaped member 16 having a transverse section 17 which is provided with a square aperture 18 adapted to slidably receive an elongated latch element in the form of a bolt 19, substantially square in cross section.

Flange 14 is likewise apertured to slidably receive the bolt 19, and within the housing formed by the U-shaped member 16 the element or bolt 19 is surrounded by a coil spring 20 which engages the transverse portion 17 at one end and at its other end a plate 21 mounted on the bolt.

When the tilt bed 11 is closed for transport, as indicated by the position of the parts in FIGURES 2 and 4, and in dotted lines in FIGURE 3, the openings in members 14 and 16 register with an opening 22 provided in the upright flange 23 of an arcuately-shaped angle member 24 affixed to and depending from the forward end of the tilt body 11. In this position of the parts, spring 20 acts on plate 21 to bias latch element or bolt 19 rearwardly, and since the element is aligned with the opening 22, it is received therein as indicated in FIGURES 2 and 3. In this position of the parts, the tilt body is locked against tilting relative to the frame 10.

As the tilt body moves downwardly to its closed or operating position, the lower edge of member 24 engages the angled upper surface 25 of the rear end of latch element 19, forcing the latter forwardly against the bias of spring 20 until the element is in alignment with the opening 22 into which it is automatically urged by the spring.

An upright handle member 26 has a rearwardly bent horizontal section or off-set portion 27 affixed to the upper surface of the forward end of latch element 19, and forming therewith a shoulder or abutment 28, serving a purpose which will hereafter become clear.

The plate 21 is suitably apertured to receive the element 19 and is held in place by a pin 29 removably mounted in the latch element and engageable with the flange 14 when the latch element is in its extended or latched position. The tilt body 11 is unlocked from the wheeled frame 10 by grasping the handle 26 and withdrawing latch element 19 from the opening 22. This allows the cylinder 12 to be actuated to tilt the body 11 and allow the load to be removed therefrom down the incline provided. A lockout for the latch element 19 is provided and comprises a rod 30 affixed, as by welding, to the upper edge of flange 23, and having a transversely bent portion 31 carrying a pair of washers 32. An elongated lockout member 33 has a bearing section 34 at one end pivotally mounted upon the rod 30 between washers 32 and having at its forward end a downwardly bent section 35. The operator withdraws the latch element 19 by means of handle 26 until bent portion 35 of the lockout element 33 engages abutment 28, as shown in FIGURE 4, whereupon the hydraulic cylinder 12 can be actuated to tilt the body and the load can be propelled therefrom. As soon as tilting is initiated, lockout member 33 moves away from the abutment 28 of the latch member so that the latter can return to the operating position of FIGURES 1 and 3 ready to receive and lock the tilt body upon its return. In the normal, locked position of FIGURES 2 and 3 lockout member 33 rests upon the upper surface of the horizontal section 27 of handle 26 ready to drop behind the shoulder 28 upon withdrawal of the latch.

It is believed that the construction and operation of the latching apparatus of this invention will be clearly understood from the foregoing description. It should likewise be understood that the invention has been described in its preferred embodiment and that modifications may be made in the invention without departing from the spirit thereof or the scope of the appended claims.

What is claimed is:
1. In a vehicle having a frame and a tilting body mounted thereon for movement between a tilted and a horizontal position; latch means holding the body in its horizontal position said latch means, comprising a bolt mounted for reciprocation on the frame, said bolt including handle means providing for said reciprocation, an opening in said body registrable with and adapted to slidably receive one end of said bolt when the body is in its horizontal position to hold said body against said tilting movements, means urging said bolt into said opening, said bolt being retractable from said opening to accommodate said movement of the body of a tilted position, a lockout device comprising an elongated lockout member pivotally mounted at one end on said body, said bolt and handle means having an off-set portion upon which the other end of said lock-out member is positioned when the body is in its horizontal position, the other end of the lockout member upon retraction of the bolt from the opening in the body engaging a shoulder of said offset portion to hold the bolt in its retracted position, said other end of said lockout member being disengaged from said shoulder of said off-set portion when said opening is displaced relative to said bolt when said body is tilted.

2. The invention set forth in claim 1 wherein said frame has an abutment mounting said bolt, a removable pin means is carried by said bolt and a spring surrounds said bolt between said pin and said abutment to bias said bolt into said opening in said body.

References Cited in the file of this patent

UNITED STATES PATENTS

| | | |
|---|---|---|
| 1,786,560 | Burrows et al. | Dec. 30, 1930 |
| 2,543,210 | Wagstaff | Feb. 27, 1951 |
| 2,587,695 | Citso | Mar. 4, 1952 |
| 2,989,344 | Lash | June 20, 1961 |

FOREIGN PATENTS

| | | |
|---|---|---|
| 11,451 | Great Britain | of 1890 |